(No Model.)

R. S. ABERNETHY.
KEYING CLAMP.

No. 338,458. Patented Mar. 23, 1886.

WITNESSES:

INVENTOR:
R. S. Abernethy
BY Munn & Co
ATTORNEYS.

UNITED STATES PATENT OFFICE.

ROBERT S. ABERNETHY, OF RUTHERFORD COLLEGE, NORTH CAROLINA.

KEYING-CLAMP.

SPECIFICATION forming part of Letters Patent No. 338,458, dated March 23, 1886.

Application filed December 3, 1885. Serial No. 184,597. (No model.)

*To all whom it may concern:*

Be it known that I, ROBERT S. ABERNETHY, of Rutherford College, Burke county, State of North Carolina, have invented a new and useful Improvement in Keying-Clamps, of which the following is a full, clear, and exact description.

My invention is designed more particularly for carpenters' use for furnishing an abutment or leverage on joist, studding, or other timber. Its principal use is in connection with wedges for forcing together flooring, wainscoting, or ceiling.

The invention consists of the special construction of the frame and the keys, all as hereinafter described and claimed.

Reference is to be had to the accompanying drawings, forming a part of this specification, in which similar letters of reference indicate corresponding parts in all the figures.

Figure 1:
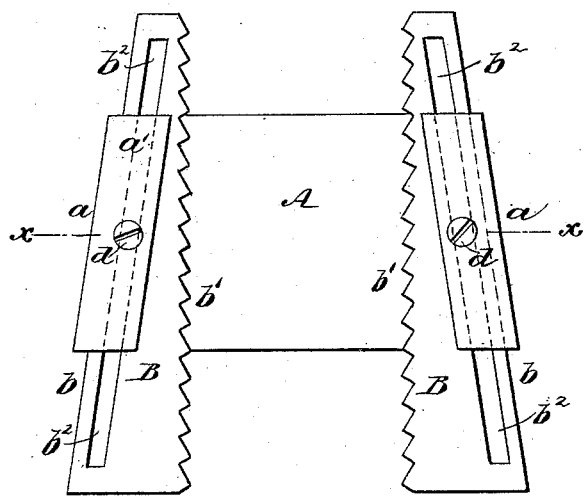
Figure 2:
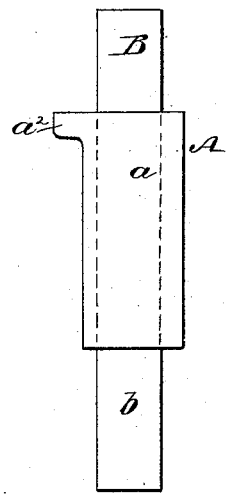
Figure 3:
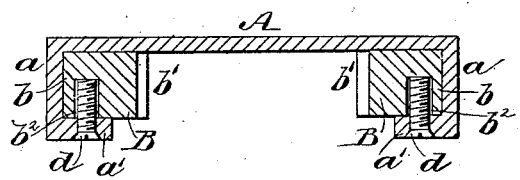

Figure 1 is an inverted plan view of my new keying-clamp. Fig. 2 is a side elevation of the same, and Fig. 3 is a transverse sectional elevation taken on the line $x\ x$ of Fig. 1.

A represents the frame, and B B the two sliding jaws or keys. The frame A is formed with the diagonal side flanges, $a\ a$, and is constructed to receive and hold the jaws B B against the diagonal side flanges, so that when the jaws are moved longitudinally they will approach or recede from the center of the tool, according to the direction they are moved. The jaws or keys B B are wedge-shaped, each formed with the diagonal smooth outer edge, $b$, and the straight serrated inner edge, $b'$; and each key is formed with a slot, $b^2$, running parallel with the outer diagonal edge, $b$, as shown in Fig. 1. The jaws B are held in place in the frame A by the inwardly-projecting flanges $a'$ and the screws $d$, that pass through screw-threaded openings in the flanges $a'$ and enter the slots $b^2$, as shown in Fig. 3. The frame A at its narrow end is formed with the outwardly-projecting lip $a^2$, to furnish a broad surface at that end of the tool to wedge against or fulcrum upon, according to the use to which the tool is put.

When the tool is used on joist or studding, it is placed astride the edge of the timber and the keys B B moved forward until their inner serrated edges come in contact with the side surfaces of the timber. This will hold the tool in place on the timber, so that any pressure at the narrow end of the frame A will cause the frame to slide down the jaws B B a short distance, which will cause them to grasp the timber with great firmness, so the tool will sustain any pressure brought to bear upon it without displacement. The tool is therefore very useful in joining flooring, wainscoting, and other tongued-and-grooved woodwork where a wedging abutment or fulcrum is required to shove the boards together.

I do not limit myself to any particular use of the tool, as it may be used to advantage in various situations.

I am aware that it is not broadly new to form a keying-clamp of a frame having diagonal side flanges and slots parallel therewith, and two jaws having inclined outer edges and straight serrated inner edges, the jaws being secured to the frame by bolts passing through the jaws and the slots in the frame and held by nuts, and I do not claim such as of my invention.

Having thus fully described my invention, I claim as new and desire to secure by Letters Patent—

As an improved article of manufacture, a keying-clamp consisting of the frame A, formed with the diagonal side flanges, $a$, the flanges $a'$, extending inward from the lower edges of the side flanges parallel with the face of the frame A, and the outward-projecting lip $a^2$ on the narrow end of the frame, the wedge-shaped jaws B B, having straight serrated inner edges, $b'$, smooth inclined outer edges, $b$, and longitudinal slots $b^2$, parallel with the inclined edges $b$, and the screws $d$, extending through the flanges $a'$ into the slots $b^2$, substantially as set forth.

ROBERT S. ABERNETHY.

Witnesses:
JAMES B. NAUGLE,
A. J. ABERNETHY.